US009145203B2

(12) United States Patent
Campbell, Jr. et al.

(10) Patent No.: US 9,145,203 B2
(45) Date of Patent: Sep. 29, 2015

(54) NATURAL LAMINAR FLOW WINGTIP (71) Applicant: The Boeing Company, Seal Beach, CA (US)

(72) Inventors: Darrell D. Campbell, Jr., Vashon Island, WA (US); Brett I. Lyons, Chicago, IL (US)

(73) Assignee: The Boeing Company, Chicago, IL (US)

( * ) Notice: Subject to any disclaimer, the term of this patent is extended or adjusted under 35 U.S.C. 154(b) by 111 days.

(21) Appl. No.: 13/665,659

(22) Filed: Oct. 31, 2012

(65) Prior Publication Data

US 2014/0117166 A1 May 1, 2014

(51) Int. Cl.
*B64C 23/06* (2006.01)
*B29C 70/00* (2006.01)

(52) U.S. Cl.
CPC ............ *B64C 23/065* (2013.01); *B29C 70/00* (2013.01); *Y02T 50/164* (2013.01)

(58) Field of Classification Search
CPC .... B64C 23/065; Y02T 50/164; B29C 35/05; B29C 66/474; B29C 66/725; B29C 70/00
USPC ........... 244/123.1, 200, 1 R, 199.4, 199.2, 91
See application file for complete search history.

(56) References Cited

U.S. PATENT DOCUMENTS

| 4,389,367 | A | | 6/1983 | Hudson |
| 4,477,042 | A | | 10/1984 | Griswold, II |
| 4,693,678 | A | | 9/1987 | Von Volkli |
| 5,286,438 | A | * | 2/1994 | Dublinski et al. ............ 264/220 |
| 5,407,153 | A | | 4/1995 | Kirk et al. |
| 5,707,576 | A | * | 1/1998 | Asher ........................... 264/258 |
| 6,828,373 | B2 | * | 12/2004 | Artz et al. ...................... 524/492 |
| 7,624,951 | B1 | * | 12/2009 | Kraft et al. ................. 244/199.4 |
| 2004/0000613 | A1 | | 1/2004 | Thomas, Jr. |
| 2006/0249626 | A1 | | 11/2006 | Simpson et al. |
| 2009/0014919 | A1 | | 1/2009 | Rossfeldt et al. |
| 2010/0000667 | A1 | | 1/2010 | Funnell |
| 2010/0171241 | A1 | | 7/2010 | Huskamp |
| 2011/0084174 | A1 | * | 4/2011 | Hemmelgarn et al. ........ 244/200 |

(Continued)

FOREIGN PATENT DOCUMENTS

| DE | 102005004345 | 10/2006 |
| EP | 1310351 | 5/2003 |

(Continued)

OTHER PUBLICATIONS

PCT/US2013/061675 International Search Report dated Jan. 30, 2014.
EP 14160595, Euroean Search Report, dated Aug. 22, 2014.

*Primary Examiner* — Valentina Xavier (57) ABSTRACT

An aircraft wing tip device may include a unitized, monolithic leading edge torque box that may be formed of polymer matrix fiber-reinforced material. The leading edge torque box may include a skin that may define a continuous, uninterrupted outer mold line surface extending aftwardly from a winglet leading edge by a distance of at least approximately 60 percent of a local chord length. The leading edge torque box may further include at least one internal component extending between opposing inner surfaces of the skin and being integrally formed therewith.

6 Claims, 5 Drawing Sheets

(56) References Cited

U.S. PATENT DOCUMENTS

2011/0094698 A1 4/2011 Grunstra
2012/0112005 A1 5/2012 Chaussee et al.

FOREIGN PATENT DOCUMENTS

| EP | 1800825 | 6/2007 |
| GB | 2040790 | 9/1980 |

* cited by examiner

NATURAL LAMINAR FLOW WINGTIP

FIELD

The present disclosure relates generally to wing tip devices and, more particularly, to hollow wing tip devices formed of composite materials in closed molds.

BACKGROUND

Winglets provide a means to reduce the negative effects of lift-induced wing drag by effectively increasing the length of the trailing edge of the wing. The effective increase in the length of the trailing edge may spread out the distribution of the vortices that are shed by the trailing edge and the wing tip as the wing flies through the air. The re-distribution of vortices may reduce aerodynamic losses from lift-induced drag. Advantageously, winglets may provide an increase in effective trailing edge length without increasing the length of the wing leading edge. In this regard, by adding winglets to the wings instead of increasing the wing span in the conventional manner, the added weight, cost, and complexity associated with the lengthening of leading edge lift-enhancement devices (e.g., slats, Krueger flaps) may be avoided.

Conventional winglets are fabricated as a hybrid assembly of components formed of different materials. For example, conventional winglets may be comprised of composite spars and skin panels that may be joined to a metallic leading edge and a metallic trailing edge, and which may include metallic attach fittings. Unfortunately, the assembly of the winglet components is a time-consuming and labor-intensive process requiring a large quantity of mechanical fasteners. The large quantity of fasteners may increase the overall weight of the winglets. In addition, specialized tooling may be required for maintaining the relative positions of the components during fastener installation.

Furthermore, fasteners that are installed in the outer mold line (OML) surface of the winglets may disrupt the airflow passing over the OML surface. The disruption in airflow may minimize the distance over which the airflow is maintained in a laminar state before the airflow becomes turbulent with a resulting increase in aerodynamic drag. For example, in conventional winglets, the distance over which the airflow is laminar may be limited to approximately 10% of the chord length, with the downwind airflow becoming turbulent over the remaining portion of the winglet. The increase in aerodynamic drag due to turbulent airflow over the winglet may limit the gains in aircraft fuel efficiency that would be possible if the airflow were maintained in a laminar state over a longer portion of the winglet chord length.

As can be seen, there exists a need in the art for a winglet configuration that maintains the air flow in a laminar state over a relatively large portion of the chord length prior to the airflow becoming turbulent.

SUMMARY

The above-noted needs associated with wing tip devices such as winglets are specifically addressed and alleviated by the present disclosure which provides an aircraft wing tip device including a unitized, monolithic leading edge torque box formed of polymer matrix fiber-reinforced material. The leading edge torque box may include a skin that may define a continuous, uninterrupted outer mold line surface extending aftwardly from a winglet leading edge by a distance of approximately 60 percent or more of a local chord length. The leading edge torque box may further include at least one internal component extending between opposing inner surfaces of the skin and being integrally formed therewith.

In a further embodiment, disclosed is wing tip device having a unitized, monolithic leading edge torque box formed of polymer matrix fiber-reinforced material. The leading edge torque box may include a skin that may define a continuous, uninterrupted, outer mold line surface that may extend aftwardly from the winglet leading edge by a distance of at least 60 percent or more of a local chord length. The leading edge torque box may further include an internal component extending between opposing inner surfaces of the skin and being integrally formed therewith. The leading edge torque box may comprise a co-cured assembly of composite layups of the skin and the internal component. The wing tip device may include a trailing edge section that may be joined to the torque box aft end.

Also disclosed is a method of maintaining laminar flow over a wing tip device. The method may include passing airflow over an OML surface of a unitized, monolithic, leading edge torque box of a wing tip device of an aircraft. The leading edge torque box may be formed of polymer matrix fiber-reinforced material and may include at least one internal component extending between opposing inner surfaces of a skin. The method may further include maintaining the airflow in a laminar state passing over the OML surface from a winglet leading edge aftwardly to a distance of at least 60 percent of a local chord length of the wing tip device.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein.

DETAILED DESCRIPTION

Figure 1:
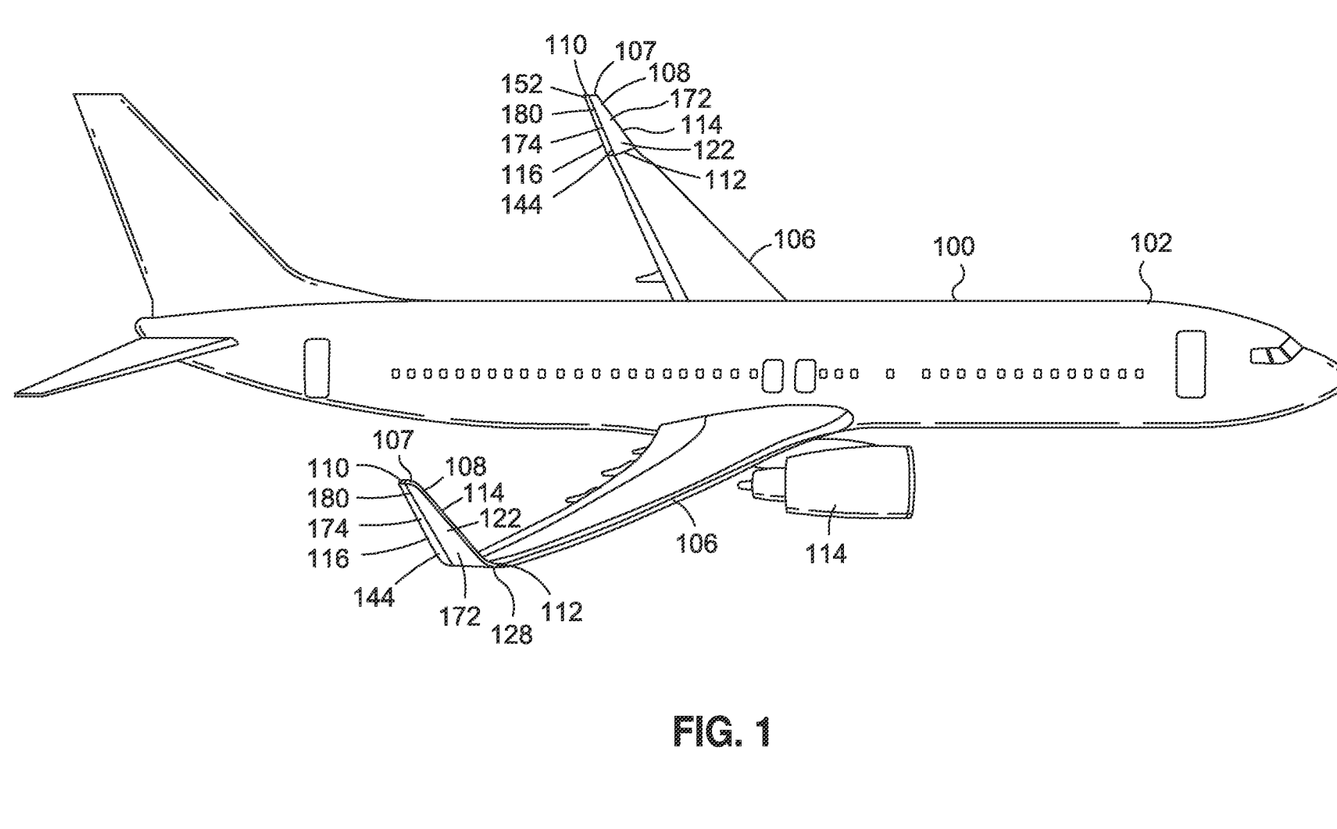
FIG. 1 is a perspective view of an aircraft having winglets.

Referring now to the drawings wherein the showings are for purposes of illustrating preferred and various embodiments of the disclosure, shown in FIG. 1 is a perspective view of an aircraft 100 having a fuselage 102 extending from a nose of the aircraft 100 to an empennage of the aircraft 100. The empennage may include one or more tail surfaces for directional control of the aircraft 100. The aircraft 100 may further include a pair of wings 106 and a pair of propulsion units 104 that may be mounted to the wings 106. The aircraft 100 may include one or more aerodynamic structures 152 configured as wing tip devices 107 and which may be fabricated from composite material. In an embodiment, the wing tip devices 107 may comprise winglets 108 mounted on the tips of the wings 106.

Figure 6:
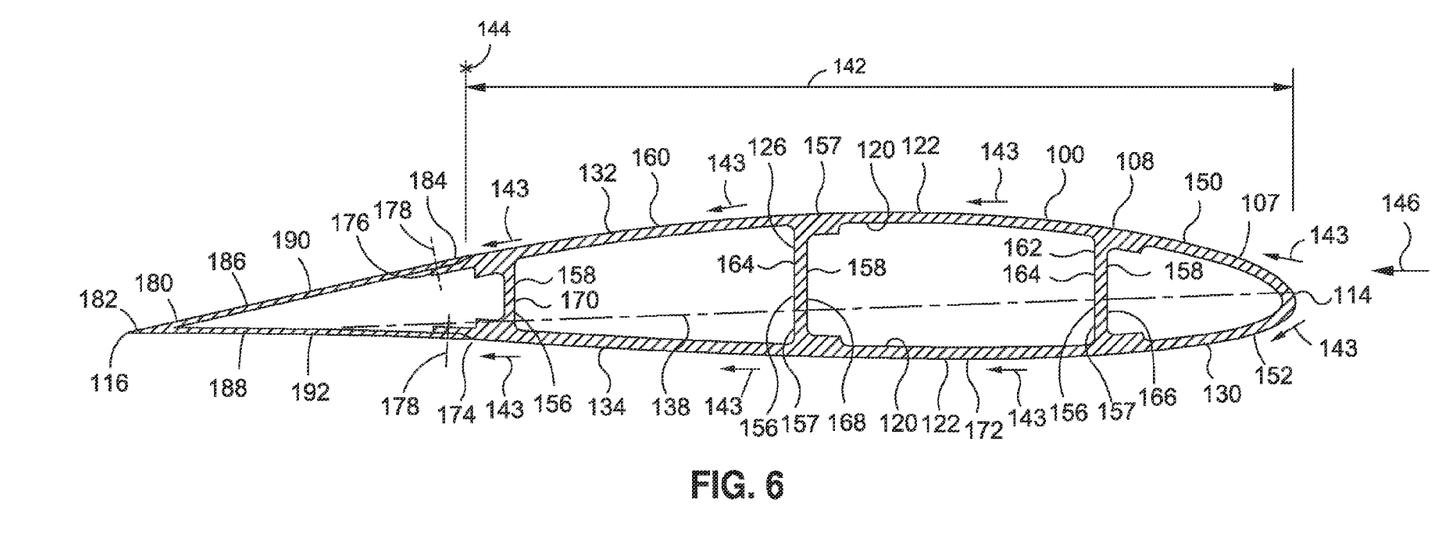
FIG. 6 is a sectional side view of a unitized, monolithic leading edge torque box taken along line 6 of FIG. 2 and illustrating a trailing edge section joined to an aft end of the leading edge torque box.

Advantageously, the wing tip device 107 disclosed herein includes a unitized, monolithic, integrally-formed, composite leading edge torque box 172 having a smooth, continuous, uninterrupted, outer mold line (OML) surface 122 that extends from the winglet leading edge 114 to an aft end 174 (FIG. 2) of the leading edge torque box 172. The continuous, uninterrupted OML surface 122 of the unitized leading edge torque box 172 is configured such that airflow 146 over the OML surface 122 is maintained in a laminar state 143 over a distance from the winglet leading edge 114 of at least approximately 60 percent of the local chord 138 length (FIG. 6). In the present disclosure, the local chord is defined as a line extending between the forward-most point on the leading to an aft-most point on the trailing edge of an airfoil section defined by a plane oriented generally parallel to a forward direction of the aircraft. Although the wing tip device 107 and leading edge torque box 172 disclosed herein are described in the context of a winglet 108, the wing tip device 107 may be provided in any size, shape, and configuration, without limitation. For example, the wing tip device 107 may be configured as a raked wing tip (not shown), a split winglet having upper and lower winglets (not shown), or in other wing tip device configurations.

Figure 2:
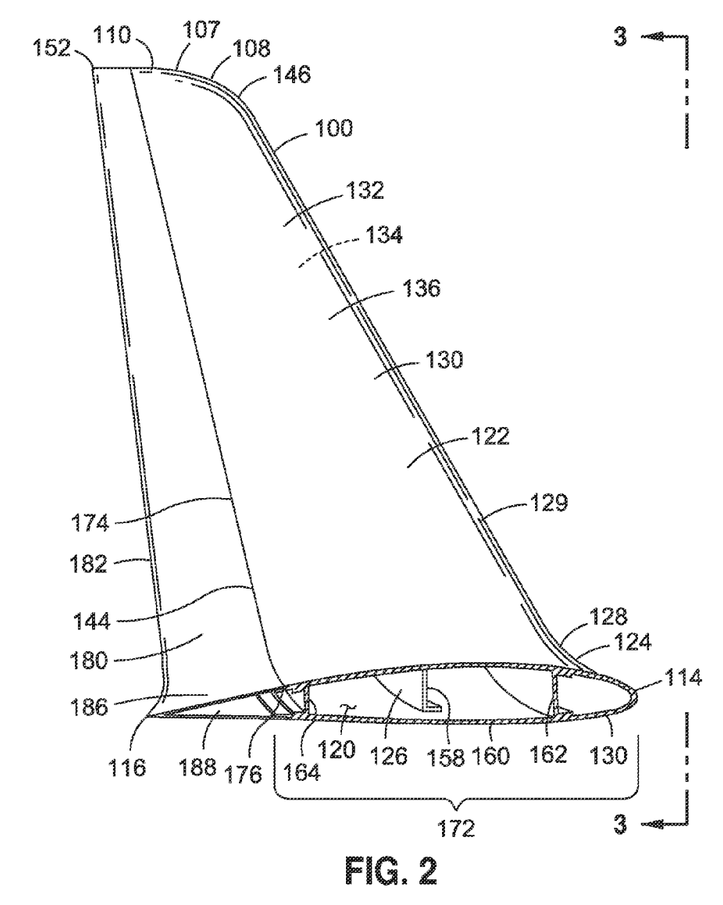
FIG. 2 is a side view of a winglet having a unitized, monolithic, leading edge torque box formed of composite material.

Referring to FIG. 2, shown is a side view of an embodiment of a winglet 108. The winglet 108 may include a winglet root 112 which may be joined to a wing 106 of an aircraft 100. The winglet 108 may further include a winglet tip 110, a winglet leading edge 114, and a winglet trailing edge 116. The leading edge torque box 172 may extend from winglet leading edge 114 to the torque box aft end 174. The winglet trailing edge 116 may be defined by a separately-attached trailing edge section 180. In an embodiment, the winglet trailing edge section 180 may be separately formed from the winglet 108 and may be attached to the torque box aft end 174 such as by mechanical fastening and/or adhesive bonding as described below.

In FIG. 2, the unitized, composite leading edge torque box 172 may have a generally hollow configuration with three-dimensional geometry 126 comprised of a composite skin 160 and one or more internal components 158 formed of composite material. The internal components 158 may comprise composite stiffeners 162 or composite spars 164 extending between inner surfaces 120 of the composite skin 160 for increasing the bending stiffness and strength of the winglet 108. However, it is contemplated that the trailing edge section 180 and the leading edge torque box 172 may be integrally formed into a unitized, monolithic, composite structure such that the winglet 108 comprises a single, unitary structure from the winglet leading edge 114 to the winglet trailing edge 116. Although a unitary structure from the winglet leading edge 114 to the winglet trailing edge 116 is not shown, such an arrangement may result in a winglet 108 having a substantially continuous, uninterrupted, outer mold line (OML) surface 122 which may result in laminar airflow 143 along a substantial portion of the distance from the winglet leading edge 114 to the winglet trailing edge 116. For example, an uninterrupted, outer mold line (OML) surface 122 from the winglet leading edge 114 to the winglet trailing edge 116 may result in laminar airflow 143 over a distance from the winglet leading edge 114 of greater than approximately 80 percent of the local chord 138 length (FIG. 6).

The unitized, monolithic, leading edge torque box 172 may be formed using a tooling system (not shown) comprising an outer mold line (OML) tool and one or more inner mold line (IML) tools or mandrels positioned within the OML tool. The IML tools or mandrels may be formed of a range of materials including, but not limited to, rigid composite mandrels covered by thin film or molded vacuum barrier materials, and/or expandable mandrels that expand when exposed to heat causing the expandable mandrels to generate internal compaction pressure for consolidation of the polymer matrix fiber-reinforced material 157. The IML tools or mandrels may also be formed of rigid, soluble mandrels or removable rigid tools that have rates of thermal expansion matching the composite material of the composite article 150 being formed. For example, the IML tools may generate internal compaction pressure of the skin 160 against an OML tool surface (not shown) while simultaneously generating internal compaction pressure against an internal component 158 positioned between a pair of the IML tools. Advantageously, the tooling system may provide a means for co-consolidating and/or co-curing composite laminates that make up the skin 160 and the internal components 158 to produce a hollow, unitized, three-dimensional composite structure without the need for assembling winglet components by adhesive bonding or mechanical fastening. Three-dimensional geometry 126 may be defined as internal components 158 that extend laterally inwardly from the inner surfaces 120 of the skin 160 such as the composite spars 164 that extend between the opposing inner surfaces 120 of the composite skin 160 on the upper side 132 and the lower side 134 of the winglet 108 in FIG. 2.

Figure 3:
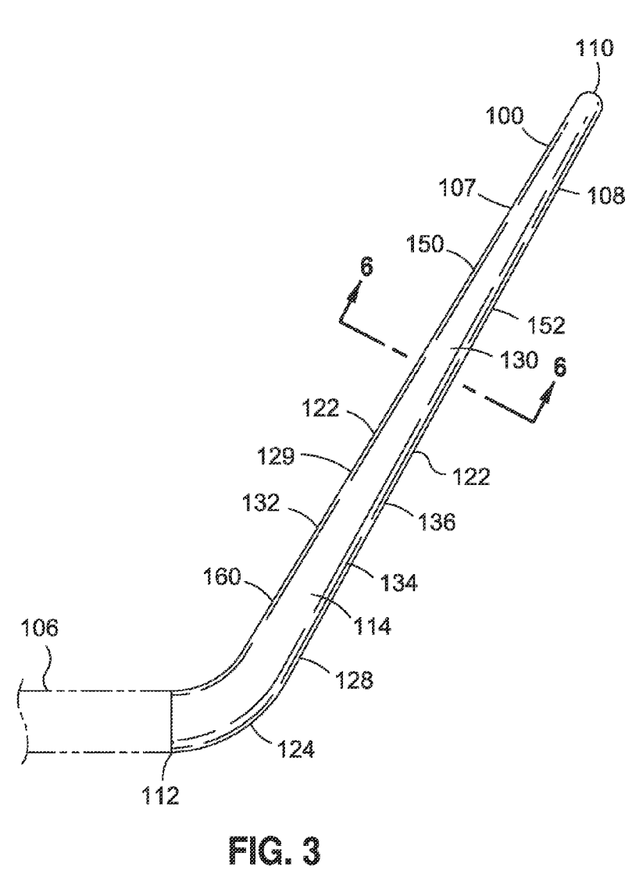
FIG. 3 is a front view of the winglet shown in FIG. 2.

Referring to FIG. 3, shown is a front view of the winglet 108 illustrating the attachment to a wing tip of a wing 106. The winglet 108 may include a curved transition 128 for transitioning the winglet 108 from a generally horizontal orientation or slight dihedral of the wing 106 to a canted section 129 of the winglet 108. The curved transition 128 may represent non-draftable geometry 124 of the winglet 108 wherein the winglet root 112 is curved at a juncture with the wing 106. In non-draftable geometry 124, conventional internal tooling may be incapable of being extracted by sliding out of the interior of a cured composite article. However, the tooling system as may be used for manufacturing the leading edge torque box 172 disclosed herein may include the use of soluble internal tooling (not shown) that may be solubilized or dissolved using water or other polar solvents into a partially liquid state to allow for removal of the internal tooling by pouring the solublized internal tooling out of the end of the cured composite article.

In FIG. 3, the winglet 108 is shown with a canted section 129 that is relatively straight along a spanwise direction 136 of the winglet 108. However, the canted section 129 may be curved and/or twisted along a spanwise direction 136 and/or the winglet 108 may have other non-draftable geometry 124 such as a swept winglet tip cap (not shown). In the embodiment shown, the winglet 108 has a winglet root 112 with a chord length that is substantially equivalent to a chord length of the wing tip. However, the winglet root 112 may be formed with a chord length that is less than the chord length of the wing tip. The chord length of the winglet 108 may taper at a relatively high rate within the curved transition 128 after which the winglet 108 may taper at a reduced rate from the end of the curved transition 128 toward the winglet tip 110. The winglet 108 may be oriented at an outward cant angle of between approximately 0-45 degrees relative to vertical. However, the winglet 108 may be oriented at any cant angle, without limitation.

Figure 4:
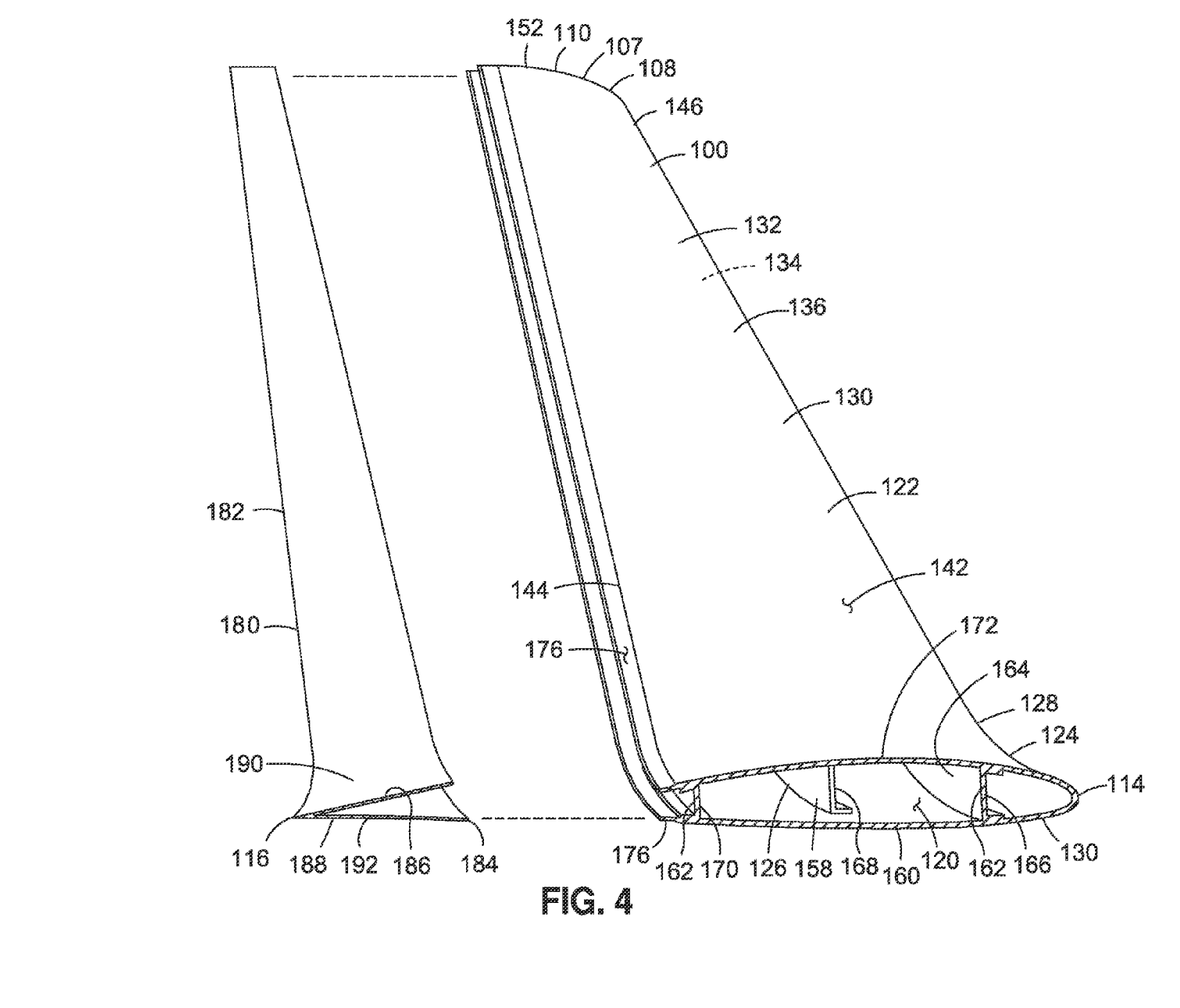
FIG. 4 is an exploded side view of a winglet including the leading edge torque box and a separate trailing edge section that be attached to the leading edge torque box.

Referring to FIG. 4, shown is a side view of the winglet 108 including the unitized, monolithic leading edge torque box 172 to which a separate trailing edge section 180 may be attached. The trailing edge section 180 may be formed of metallic material and/or composite material and may be joined to the torque box aft end 174. For example, the trailing edge section 180 may be attached to a rear spar 170 that may be included with the leading edge torque box 172 and which may be located at the torque box aft end 174. In an embodiment, the trailing edge section 180 may include a forward end 184 that may be mechanically fastened or adhesively bonded to the torque box aft end 174 as described below.

In FIG. 4, the leading edge torque box 172 may include one or more internal components 158 such as one or more spars 164 extending at least partially along a spanwise direction 136 of the wing tip device 107. For example, the leading edge torque box 172 may include a front spar 166 and a rear spar 170. The front spar 166 may be located aft of the winglet leading edge 114. The rear spar 170 may be located at the torque box aft end 174. The front spar 166 and the rear spar 170 may extend between and/or may interconnect the opposing inner surfaces 120 of the skin 160 on the upper side 132 and the lower side 134 of the winglet 108. The leading edge torque box 172 may include a mid spar 168 located between the front spar 166 and the rear spar 170 for stiffness and strength. One or more of the spars 164 may extend from the winglet root 112 to the winglet tip 110. However, one or more of the spars 164 may extend between any two locations between the winglet root 112 and the winglet tip 110. In this regard, the spars 164 are not limited to extending between the winglet root 112 and winglet tip 110

Figure 5:
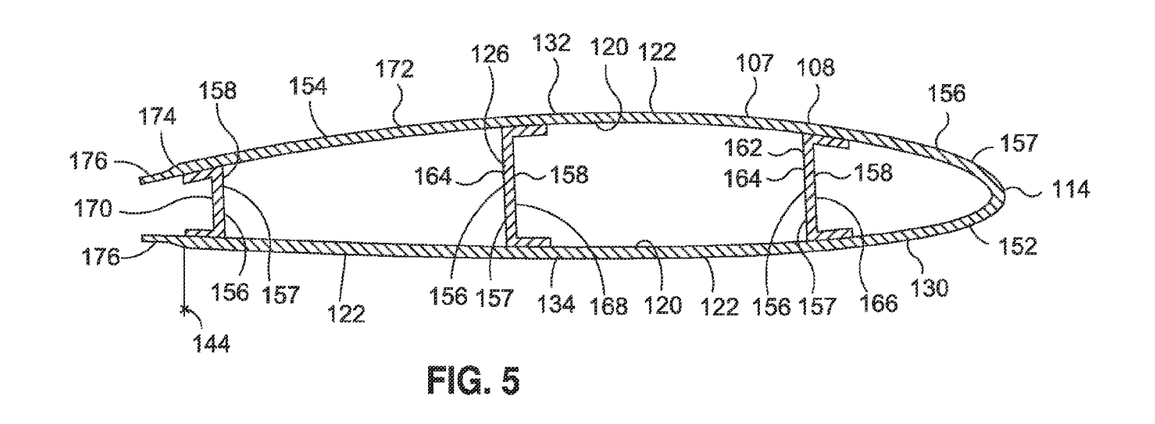
FIG. 5 is a sectional side view of an assembly of composite layups of a skin and internal spars that may be co-cured into a unitized, monolithic leading edge torque box.

Referring to FIG. 5, shown is a sectional side view of an assembly 154 of composite layups 156 of the skin 160 and the front spar 166, mid spar 168, and rear spar 170 and which may be co-cured with the skin 160 into the unitized, monolithic leading edge torque box 172. In this regard, the leading edge torque box 172 may be formed as a co-consolidated and co-cured assembly 154 of composite layups 156 of the skin 160 and the internal component 158 as mentioned above. In an embodiment, the composite layups 156 may comprise thermosetting composite material, thermoplastic composite material, pre-impregnated composite material, and/or resin-infused composite material polymer matrix. The polymer matrix fiber-reinforced material 157 may include carbon fibers, glass fibers, ceramic fibers, or other fibers types in a polymeric material or resin matrix such as epoxy. The resin matrix may comprise a thermosetting resin, or the resin matrix may comprise a thermoplastic resin.

Referring to FIG. 6, shown is a sectional view of the unitized leading edge torque box 172 with integrally processed (e.g., co-cured) three-dimensional geometry 126 including the composite internal components 158 (e.g. spars 164) integrally-formed with the composite skin 160. As indicated above, the leading edge torque box 172 advantageously provides a unitized, integrally-formed, aerodynamic structure having a smooth and dimensionally-precise OML surface 122. The skin 160 defines a continuous, uninterrupted, outer mold line (OML) surface 122 on the upper side 132 and the lower side 134 of the winglet 108. The spars 164 and/or other internal component 158 (e.g., stiffeners 162, ribs—not shown) are shown oriented generally transverse to the skin 160. The spars 164 may be positioned at any location between the winglet leading edge 114 and an aft end 174 of the leading edge torque box 172. The front spar 166 and skin 160 may define an integrally-formed leading edge section 130 extending from the winglet leading edge 114 to the front spar 166. The leading edge torque box 172 may provide torsional rigidity and bending stiffness to the winglet 108 to resist deflection under static and/or dynamic loading that may undesirably alter the aerodynamics of the winglet 108.

In FIG. 6, the trailing edge section 180 may comprise at least two separate panels including a trailing edge upper panel 184 and a trailing edge lower panel 186. The trailing edge upper panel 184 and the trailing edge lower panel 186 may each have a forward end 184 that may be joined to the torque box aft end 174. For example, the forward end 184 of each one of the trailing edge upper panel 184 and a trailing edge lower panel 186 may be mechanically fastened and/or an adhesively bonded to the torque box aft end 174. In an embodiment, the torque box aft end 174 may include a recess 176 extending in a spanwise direction 136 along the winglet 108. The recess 176 may be sized and configured to receive the forward end 184 of the trailing edge upper panel 184 and trailing edge lower panel 186 such that the OML surface 122 of the upper side 132 and lower side 134 of the winglet 108 is at substantially the same level or height as the trailing edge upper surface 188 and trailing edge lower surface 190 respectively defined by the trailing edge upper panel 184 and the trailing edge lower panel 186.

In addition, the torque box aft end 174 is preferably configured to minimize the width of a gap (not shown) that may occur between the aft edge of the OML surface 122 and the forward edge of the trailing edge upper panel 184 and trailing edge lower panel 186. An aft end 182 of the trailing edge upper panel 184 and the trailing edge lower panel 186 may be joined together (e.g., mechanically fastened, adhesively bonded) at a convergence thereof. However, the trailing edge section 180 may be formed as a unitary structure comprising the trailing edge upper panel 184 and the trailing edge lower panel 186 integrally formed with the trailing edge upper panel 184.

In FIG. 6, the leading edge torque box 172 may be configured such that the airflow 146 remains laminar over the OML surface 122 until the airflow 146 reaches a laminar-turbulent flow transition point 144 at an aft end of the OML surface 122 on the upper side 132 and the lower side 134 of the wing. The location 140 of the laminar-turbulent flow transition point 144 may be defined as a percentage of the local chord length. For example, the leading edge torque box 172 may provide a continuous, uninterrupted, OML surface 122 resulting in a laminar flow region 142 that extends aftwardly from the winglet leading edge 114 by a distance of at least 60 percent of a local chord 138 length. However, the leading edge torque box 172 may be configured such that the airflow 146 remains laminar over a distance from the winglet leading edge 114 of at least 70 percent to 80 percent or more of the local chord 138 length. In the present disclosure, the OML surface 122 may comprise the surface of the winglet 108 that is exposed to the airflow 146 passing along the OML surface, and excludes surfaces of the leading edge torque box 172 that are unexposed to the airflow 146.

Advantageously, the integrally-formed and unitized leading edge torque box 172 provides an advantage over conventional winglet (not shown) construction which may include mechanical fasteners (not shown) in the OML surface in the area adjacent to the winglet leading edge. For example, conventional winglet construction may include a plurality of mechanical fasteners installed at a junction of a separate leading edge skin (not shown) and front spar (not shown). As indicated above, such mechanical fasteners (not shown) in the OML surface may disrupt the airflow and may result in turbulent flow aft of the front spar (not shown) which may be located a distance from the winglet leading edge of approximately 10 percent or less of the local chord length. Disruption of the airflow by such mechanical fasteners or by other discontinuities in the OML surface of conventional winglets may cause the airflow to become turbulent over a majority of the winglet which may increase aerodynamic drag and reduce aerodynamic performance of the winglet.

Figure 7:
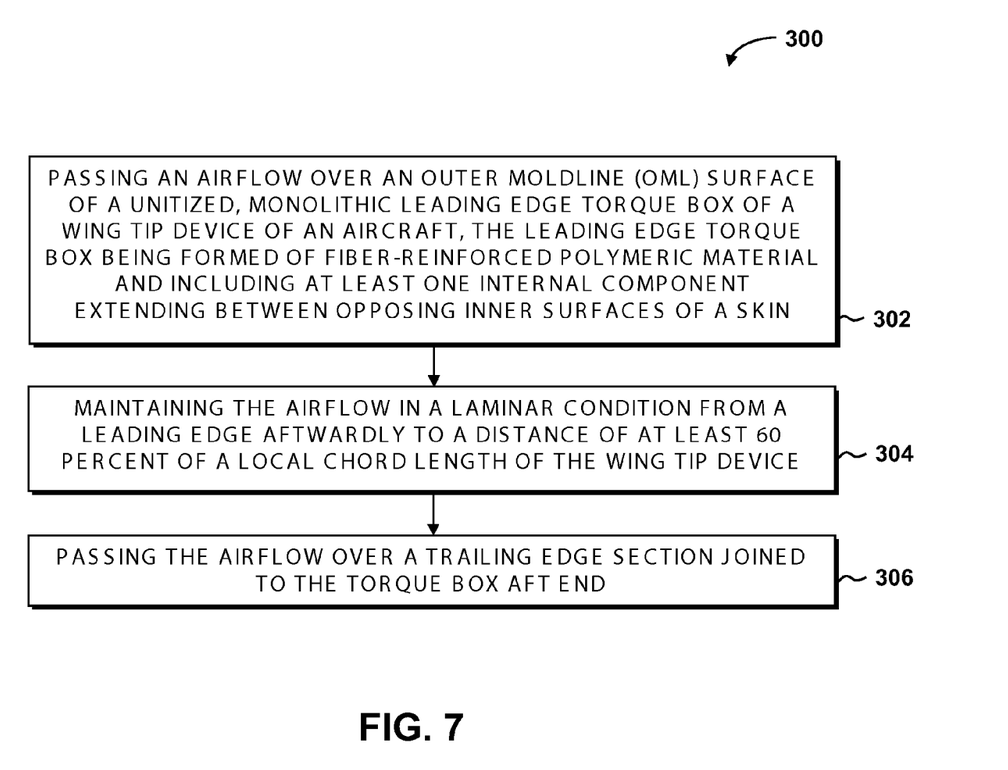
FIG. 7 is a flow diagram illustrating one or more operations that may be included in a method of maintaining laminar flow over a wing tip device.

Referring to FIG. 7, shown is a flow diagram illustrating one or more operations that may be included in a method 300 of maintaining laminar flow 143 (FIG. 6) over a wing tip device 107 such as the winglet 108 illustrated and FIGS. 1-6.

Step 302 of the method 300 of FIG. 7 may include passing airflow 146 (FIG. 6) over an outer mold line (OML) surface 122 of a unitized, monolithic leading edge torque box 172 of a wing tip device 107 of an aircraft 100. FIG. 6 illustrates the oncoming airflow 146 passing over the winglet leading edge 114. As indicated above, the leading edge torque box 172 is formed a unitized, integrally-formed, composite structure having a smooth, uninterrupted, and continuous OML surface 122. In addition, the leading edge torque box 172 provides a dimensionally-precise contour and finish of the OML surface 122 which is imparted by use of an OML tool (not shown) in combination of one or more inner mold line (IML) tools (not shown) to generate internal compaction pressure (not shown) of the skin 160 against a precisely-controlled contour and finish of the OML tool surface (not shown).

Step 304 the method 300 of FIG. 7 may include maintaining the airflow 146 in a laminar state 143 when passing the airflow 146 over the OML surface 122 of the winglet 108 from the winglet leading edge 114 aftwardly to a distance of at least 60 percent more of a local chord 138 length of the winglet 108. In an embodiment, the leading edge torque box 172 airflow 146 may be configured such that the torque box aft end 174 is located at a distance from the leading edge of 60-70 percent or more of the local chord 138 length such that the airflow 146 remains laminar at least until reaching the torque box aft end 174. The method may include maintaining the airflow 146 in a laminar state 143 while passing the airflow 146 over the winglet 108 from the curved transition 128 located between the wing tip and the canted section 129 of the winglet 108.

Step 306 the method 300 of FIG. 7 may include passing the airflow 146 over a trailing edge section 180 that may be joined to the torque box aft end 174 such as by mechanically fastening and/or adhesively bonding. The torque box aft end 174 may represent a laminar-turbulent flow transition point 144 where the airflow 146 may transition from laminar flow 143 (FIG. 6) to turbulent flow downwind of the laminar-turbulent flow transition point 144. The turbulent flow may result from disruption of the airflow 146 at the juncture between the trailing edge section 180 and the aft edge of the OML surface 122 of the leading edge torque box 172. For example, turbulent flow may result from airflow disruption due to mechanical fasteners installed in the OML surface and/or as a result in a gap or a difference in height between the forward end 184 of the trailing edge section 180 and the aft end of the OML surface 122 of the trailing edge torque box.

Advantageously, the wing tip device 107 disclosed herein provides a means for achieving natural laminar flow over a wing tip device 107 such as a winglet 108 without the use of flow enhancement devices such as a porous skin surface (not shown) or other devices. In addition, the unitary, monolithic, leading edge torque box 172 advantageously provides a continuous, uninterrupted OML surface 122 from the winglet leading edge 114 to an aft end of the leading edge torque box 172. By providing a tightly-controlled contour and finish on the OML surface 122 of the leading edge torque box 172, disruption of the airflow 146 may be minimized such that the airflow 146 may be maintained in a laminar state 143.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A method of maintaining laminar flow over a wing tip device, comprising the steps of:
    passing an airflow over an outer mold line (OML) surface of a unitized, monolithic, integrally-formed, composite leading edge torque box of a wing tip device of an aircraft, the leading edge torque box being formed of composite layups of polymer matrix fiber-reinforced material and including at least one composite spar or stiffener integrally-formed with and extending between opposing inner surfaces of a composite skin, the leading edge torque box being formed as a co-cured assembly using inner mold line tools including rigid soluble mandrels positioned within an interior of the leading edge torque box, the interior containing two or more cavities each configured to receive a soluble mandrel such that a pair of soluble mandrels is located on opposite sides of a composite layup of a composite spar or stiffener to position the composite spar or stiffener relative to the composite skin, the soluble mandrels expanding when heated compacting the composite layup of the composite skin against an outer mold line tool surface while simultaneously compacting the composite layup of the composite spar or stiffener between the pair of soluble mandrels, the rigid soluble mandrels being removable by solubilization; and
    maintaining the airflow in a laminar state from a winglet leading edge aftwardly to a distance of at least approximately 60 percent of a local chord length of the wing tip device.

2. The method of claim 1, wherein the step of maintaining the airflow in a laminar state comprises:
    maintaining the airflow in a laminar state from the winglet leading edge to a distance of at least 70 percent of the local chord length.

3. The method of claim 1, wherein the step of passing the airflow over the OML surface further includes:
    passing the airflow over the OML surface of a winglet.

4. The method of claim 3, wherein the step of passing the airflow over the OML surface of the winglet includes:
    passing the airflow over a curved transition between the wing tip and a canted section of the winglet.

5. The method of claim 1, further comprising the step of:
    passing the airflow over a trailing edge section joined to a torque box aft end.

6. The method of claim 1, wherein:
    the spar extends at least partially along a spanwise direction of the wing tip device.

* * * * *